June 12, 1962  J. F. WILSON  3,038,508
GUIDE FOR JIGSAW BLADE
Filed Sept. 21, 1960

INVENTOR.
JAMES F. WILSON
BY Louis Necho
ATTORNEY

United States Patent Office 3,038,508
Patented June 12, 1962

3,038,508
GUIDE FOR JIGSAW BLADE
James F. Wilson, 5927 Chester Ave., Philadelphia, Pa., assignor of twenty-five percent to Lawrence J. Moran, Glenolden, Pa., and twenty-five percent to Harry Russo and twenty-five percent to Frank J. Anastasio, both of Philadelphia, Pa.
Filed Sept. 21, 1960, Ser. No. 57,559
3 Claims. (Cl. 143—162)

This invention relates to a guide for use in connection with a reciprocating saw blade of the vertically disposed type shown in Miller Patent No. 729,200, or of the horizontally disposed type shown in Waddell Patent No. 2,776,680.

The object of the invention is to produce an improved guide for a reciprocating saw blade.

The full nature of the invention will be understood from the following specification and the accompanying drawings in which.

Figure 1:
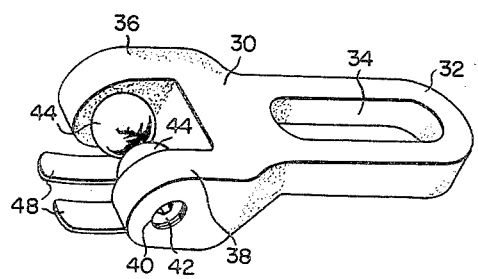
FIG. 1 is a perspective view of the improved guide embodying my invention.

A conventional jigsaw includes a work table 10 for supporting a work piece 12, said work table having a slot 14 through which saw blade 16 is reciprocated by any suitable means, not shown. Since the mounting and operation of the saw are conventional and form no part of the invention, it is thought sufficient to say that the upper and lower ends of the blade are detachably secured by wing nuts 18 to upper and lower arms 20, which are vertically reciprocated by a motor such as that shown in the Waddell patent.

Figure 2:
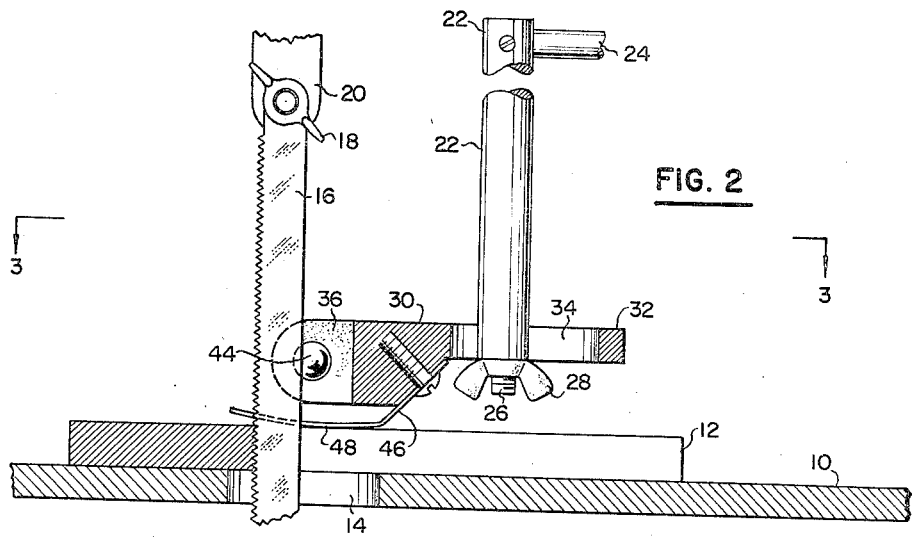
FIG. 2 is a fragmentary, and diagrammatic, view, partly in vertical section and partly in elevation, looking in the direction of line 2—2 on FIG. 2 and showing the application of the guide of FIG. 1 to a conventional, vertically disposed, reciprocating saw blade.

According to my invention, I provide a vertical arm 22 which is secured to, or carried by, a vertically adjustable support 24. Arm 22 is provided with a reduced stem 26 to which my guide is secured by wing nut 28 or the like, as shown in FIG. 2.

The guide of my invention includes a relatively thick body portion 30 and an integral, relatively thin, portion 32, which is provided with slot 34 to permit lateral adjustment of the guide relative to the saw blade and to supporting arm 22.

Figure 3:
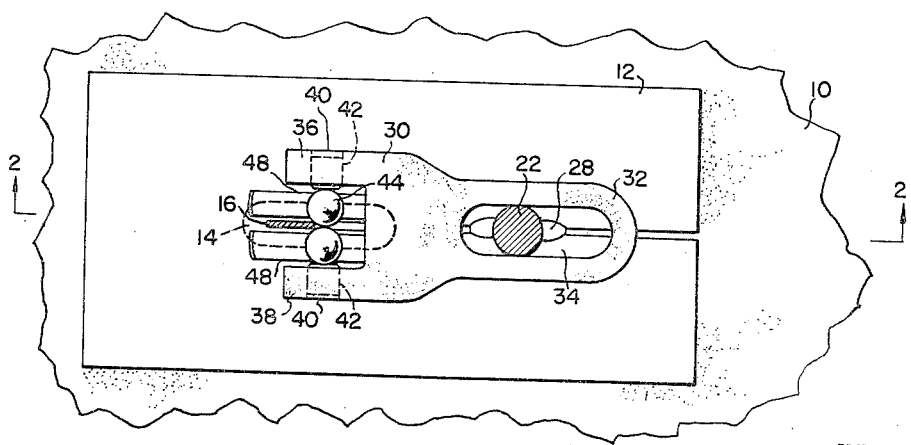
FIG. 3 is a sectional view looking in the direction of line 3—3 on FIG. 2.

The thick portion 30 of the guide is slotted to form two spaced arms 36 and 38 which are provided with bores 40 for receiving set screws 42. The inner ends of screws 40 are concaved so as to form seats for spherical balls 44. To mount the balls, screws 40 are backed off, the balls are held in position between arms 36 and 38, and each of the screws is turned, a little bit at a time, so as to center, and clamp, the two balls there-between, as best shown in FIG. 3.

The guide is also provided with a leaf spring 46 which is suitably secured to the underside of portion 30 of the guide and which is slotted to form spaced arms 48 which are best shown in FIG. 1. Arms 48 are spaced from the underside of the guide so as yieldably to clamp the work piece onto the work table.

In use, the guide is secured to arm 22 in a manner to cause the saw blade to enter the nip of balls 44 and arm 22 is adjusted vertically to cause arms 48 to bear down on the work piece with the desired pressure. For thicker or thinner saw blades, smaller or larger balls can be used.

What I claim is:

1. A guide for a reciprocating saw blade, said guide including a body portion, a pair of spaced arms at one end thereof, there being registering tapped holes in said arms, set screws engageable in said holes, the inner ends of said screws being dished to form juxtaposed concave seats, and two balls disposed in said seats and clamped together by said screws.

2. The structure recited in claim 1 and spaced, parallel spring arms carried by said body portion and disposed below, and spaced from, the underside of said arms.

3. The structure recited in claim 1 in which said body portion has a slot therein, and means passing through said slot and engaging a fixed extraneous support for adjustably mounting said guide relative to said blade.

References Cited in the file of this patent
UNITED STATES PATENTS

| 729,200 | Miller | May 26, 1903 |
| 2,191,410 | Ocenasek | Feb. 20, 1940 |
| 2,654,405 | Hulfish | Oct. 6, 1953 |

FOREIGN PATENTS

| 21,452 | Austria | Sept. 25, 1905 |